United States Patent
Pinho et al.

(10) Patent No.: US 12,411,751 B2
(45) Date of Patent: Sep. 9, 2025

(54) HIERARCHICAL MODELING APPROACH FOR DIGITAL REPAIR PARTS PREDICTION

(71) Applicant: Dell Products L.P., Round Rock, TX (US)

(72) Inventors: Rômulo Teixeira de Abreu Pinho, Rio de Janeiro (BR); Adriana Bechara Prado, Rio de Janeiro (BR); Roberto Nery Stelling Neto, Rio de Janeiro (BR); Jeffrey Scott Vah, Round Rock, TX (US); Aaron Sanchez, Austin, TX (US); Ravi Shukla, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 849 days.

(21) Appl. No.: 17/695,526

(22) Filed: Mar. 15, 2022

(65) Prior Publication Data
US 2023/0315607 A1   Oct. 5, 2023

(51) Int. Cl.
*G06F 11/34* (2006.01)
*G06F 18/243* (2023.01)
*G06N 3/0442* (2023.01)
*G06N 20/00* (2019.01)
*G06N 20/20* (2019.01)

(52) U.S. Cl.
CPC ...... *G06F 11/3476* (2013.01); *G06F 11/3428* (2013.01); *G06F 18/24323* (2023.01); *G06N 20/20* (2019.01); *G06N 3/0442* (2023.01); *G06N 20/00* (2019.01)

(58) Field of Classification Search
CPC ........ G06N 20/00; G06N 20/10; G06N 20/20; G06N 3/04; G06N 3/0442; G06F 11/3476; G06F 11/3428; G06F 18/24323
See application file for complete search history.

(56) References Cited

U.S. PATENT DOCUMENTS

| | | | |
|---|---|---|---|
| 2021/0383206 A1* | 12/2021 | Teppoeva | G06F 11/004 |
| 2023/0139437 A1* | 5/2023 | Nicacio Braga | G06F 18/2431 |
| | | | 706/15 |

* cited by examiner

*Primary Examiner* — Shane D Woolwine
(74) *Attorney, Agent, or Firm* — Workman Nydegger

(57) ABSTRACT

One example method includes accessing input data elements from logs that identify user problems with computing system components, the data elements each associated with a respective original class label that identifies a class of computing system components to which the data element relates, the respective original class labels forming a group of class labels, and a first of the original class labels is overrepresented in the group, and reducing overrepresentation of the first original class label in the group by creating an arbitrary aggregation of some of the class labels that includes the first original class label. The method includes creating, based on a hierarchical modeling structure, prepared data in which an original class label is replaced by the aggregation. Next a hierarchical model and benchmark model are trained, and each model generates respective predictions for comparison. An inferencing process is performed to determine which predicted label will be used.

20 Claims, 13 Drawing Sheets

```
model_specs = [
    {
        "node": {                                    500
            "name": "root",
            "model": {
                "parent": None,
                "labels": {
                    "motherboard": ["motherboard"],
                    "lcd": ['lcd', 'lcd assembly", "lcd bezel", "lcd cover", "lcd hinge"], # specify label aggregation
                    "others": None, # keyword to specify the aggregation of the complement of the label set above
                }
            },
            "children" [
                {
                    "node": {
                        "name" "LCD",
                        "model" {
                            "parent": {
                                "label": "lcd"
                            },
                            "labels": {
                                "all": None # keyword to specify all labels from parent class
                            }
                        }
                    }
                },
                {
                    "node": {
                        "name": "others",
                        "model": {
                            "parent": {
                                "label": "others"
                            }
                            "labels": {
                                "all": None
                            }
                        }
                    }
                }
            ]
        }
    },
]
```

FIG. 5

```
1   def make_hierarchical_data(node, df_data, label,column):                      600
2
3       node["data"] = make_node_data(node, df_data, label_column)
4
5       if "children" not in node:
6           return
7
8       for k, n in enumerate(node["children"]):
9           model = n["node"]["model"]
10          df_node_data = df_data
11          if model["parent"] is None:
12              raise ValueError("A child node must have a parent model.")
13
14          parent_label = model["parent"][ "label"]
15
16          parent_node_labels = node["model"]["labels"][parent_label]
17          df_node_data = df_data[df_data[label_column].isin(parent_node_labels)]
18
19          make_hierarchical_data(n["node"], df_node_data, label_column)
```

FIG. 6

```
1  def train_hierarchical_model(
2      node, x_column, y_column                                                  700
3      ### The maximum number of words to be used (most frequent)
4      MAX_NB_WORDS = 10000,
5      # Max number of words in each dispatch
6      MAX_SEQUENCE_LENGTH = 500,
7      # This is fixed.
8      EMBEDDING_DIM = 128,
9      # training epochs
10     epochs = 1,
11     # batch size
12     batch_size = 64,
13 ):
14     transformer, model, history, metrics = train_node_model(node, x_column, label_column)
15     node["model"]["transformer"] = transformer
16     node["model"]["instance"] = model
17     node["model"]["history"] = history
18     node["model"]["metrics"] = metrics
19
20     if "children" not in node:
21     return
22
23     for k, n in enumerate(node["children"]):
24         train_hierarchical_model(n["node"], x_column, y_column)
```

FIG. 7

```
1  def predict_model(data, x_column, transformer, model):
2      x = transformer(data[x_column])
3
4      pred_labels = model.predict(X)
5
6      return pred_labels
```
800

FIG. 8

```
1  def predict_hierarchical(df_test, node, df_node_data, x_column):
2
3      #assign local node predictions to global test data
4      prediction = predict_node(node, df_node_data, x_column)
5      df_test.loc[df_node_data.index, "prediction"] = prediction.values
6
7      if "children" not in node:
8          return
9
10     for k, n in enumerate(node["children"]):
11         model = n["node"]["model"]
12
13         if model["parent"] is None:
14             raise ValueError("A child node must have a parent model.")
15
16         # filter data according to parent label
17         parent_label = model["parent"]["label"]
18         df_data = df_node_data[(prediction==parent_label).values]
19
20         if len(df_data > 0:
21             predict_hierarchical(df_test, n["node"], df_data, x_column)
22
```
900

FIG. 9

```
1  baseline_specs = copy.deepcopy(model_specs)
2
3  baseline_specs[0]["node"]["name"] = "baseline"
4  baseline_specs[0]["node"]["model"]["transformer"] = baseline_model["transformer"]
5  baseline_specs[0]["node"]["model"]["instance"] = baseline_model["instance"]
6  baseline_specs[0]["node"]["model"]["history"] = baseline_model["history"]
7  baseline_specs[0]["node"]["model"]["metrics"] = baseline_model["metrics"]
```
1000

FIG. 10

```
1  def compare_hierarchical(instance, benchmark, data, x_column, label_column, metric="f1_weighted"):
2      predict_hierarchical(data, instance, data, x_column)
3
4      benchmark_transformer = benchmark["model"]["transformer"]
5      benchmark_model = benchmark["model"]["instance"]
6      benchmark_pred = predict_model(data, x_column, benchmark_transformer, benchmark_model)
7
8      true = data[label_column].values
9      instance_pred = data["prediction"].values
10     benchmark_pred = benchmark_pred.values
11
12     metrics_hierarchical(instance, true, instance_pred)
13
14     metrics_hierarchical(benchmark, true, benchmark_pred)
15
16     improve_hierarchical(instance, benchmark, metric)
```

```
1   def metrics_hierarchical(node, true, pred):
2       """
3       Take raw predictions and ground truth samples as input and
4       compute aggregation metrics based on the provisional hierarchical
5       model specs given by 'node'
6       """
7       # aggregate labels according to current hierarchical level
8       agg_true = np.array(copy.deepcopy(true))
9       agg_pred = np.array(copy.deepcopy(pred))
10      for l, labels in node["model"]["labels"].items():
11          print(l, '->', labels)
12          if l != 'all':
13              idx_true = np.where([True if t in labels else False for t in true])
14              idx_pred = np.where([True if p in labels else False for p in pred])
15
16              agg_true[idx_true] = l
17              agg_pred[idx_pred] = l
18
19      # obtain metrics for aggregate labels
20      node["metrics"] = metrics_node(node, agg_true, agg_pred)
21
22      if "children" not in node:
23          return
24
25      for k, in enumerate(node["children"]):
26          model = n["node"]["model"]
27
28          #filter data according to parent label
29          parent_label = model["parent"]["label"]
30          parent_note_labels = node["model"]["labels"][parent_label]
31          label_idx = np.where(agg_pred == parent_label)
32
33          if len(true[label_idx]) > 0:
34              metrics_hierarchical(n["node"], true[label_idx], pred[label_idx])
```

FIG. 12

```
1300
1   def improve_hierarchical(instance, benchmark, metric="f1_weighted"):
2       node["improve_benchmark"] = improve_node(instance, benchmark, metric)
3
4       if "children" not in node:
5           return
6
7       for k, n in enumerate(instance["children"]):
8           # assume benchmark specs mirrors the structure of instance_specs
9           b = benchmark["children"][k]
10
11          improve_hierarchical(n["node"], n["node"], metric)
```

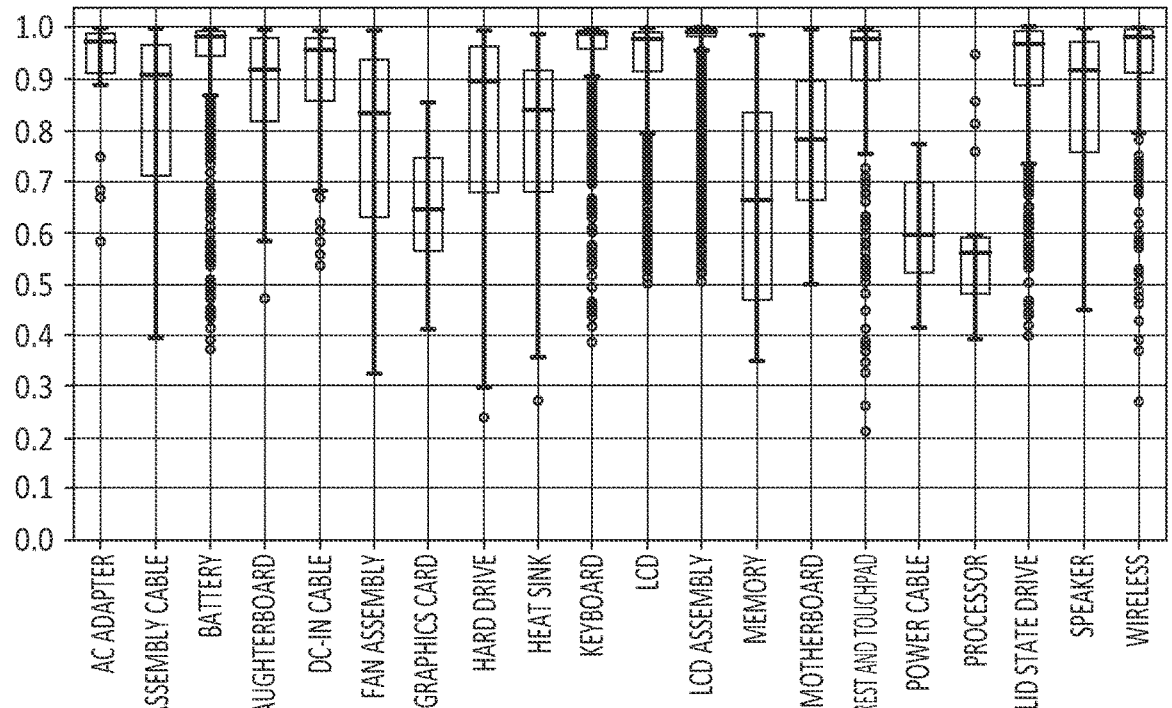
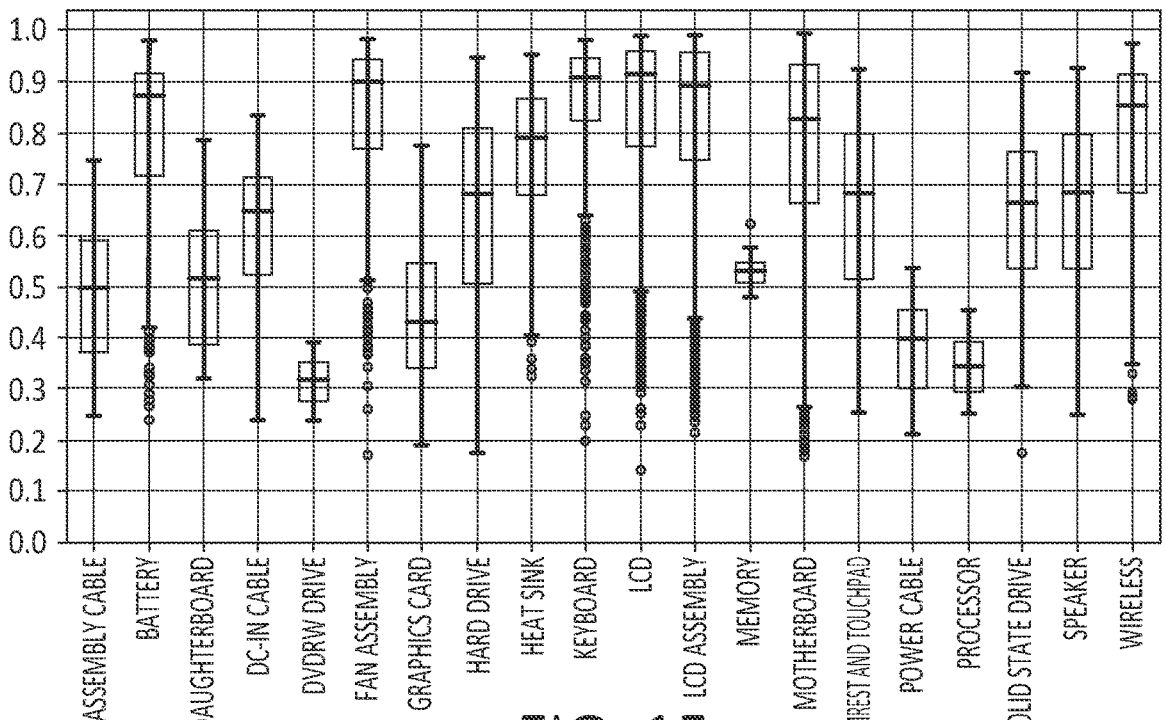
FIG. 15

HIERARCHICAL MODELING APPROACH FOR DIGITAL REPAIR PARTS PREDICTION

FIELD OF THE INVENTION

Embodiments of the present invention generally relate to predicting the need for parts replacement, such as in computing components for example. More particularly, at least some embodiments of the invention relate to systems, hardware, software, computer-readable media, and methods for digital repair prediction models that may overcome class imbalance problems, and may work effectively with small sample sizes.

BACKGROUND

Businesses and other organizations may benefit from timely, and accurate, predictions as to when parts of a component or system may be expected to fail. Issue resolution via the prediction of parts to be replaced in a system can be achieved by modeling the relationship between support call logs and replaced parts. A model of such relationship can be obtained via a supervised learning approach where the input is the raw, or processed, text of the call log and the output, that is, a predicted label, identifies the expected part or parts to be replaced.

One significant challenge with this approach however is class imbalance. In the real world, some parts are replaced more often than others. For example, due to the integration of components in motherboards, a failure in, for example, a welded HDMI connector, resulting in a display failure, may nonetheless lead to the replacement of the entire motherboard, even though it was only the HDMI connector that was problematic. This leads to some parts, such as the motherboard in the aforementioned example, being overrepresented in training sets used to build the referred model. That is, the motherboard may have been characterized as the failure point, and the failure thus ascribed to the motherboard, even though the actual problem lies elsewhere. In this example then, the motherboard is overrepresented in the failure training data, since it has been listed as a failure point but actually is not. Put another way, this failure training data lacks granularity, that is, the ability to discriminate at a lower level than the motherboard for determining what repairs actually need to be performed. Thus, the modeling step performed by a failure prediction model may be hindered by biases in the dataset that can lead, for example, to erroneous conclusions, and unnecessary expense.

Approaches to the problem of imbalance, that is, overrepresentation in a dataset, have been devised, but suffer from significant shortcomings. Such approaches may include adding synthetic samples of the under-represented classes, or removing samples of the over-represented classes, in an attempt to balance the class data. However, both of these approaches can lead to creation of further biases, resulting in data representations that still not reflect the real world conditions.

Another problem with known approaches to the creation, training, and use, of failure prediction models concerns the relatively small sample sizes typically employed by those models. While some approaches may be employed that aggregate the raw training data samples into classes, a danger exists that where hierarchical structures are employed, the total number of training samples available may be reduced to the point that results obtained by the model are inaccurate.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 5 discloses a model architecture for implementing a hierarchical modeling approach, according to some example embodiments.

FIG. 6 discloses an example algorithm for aggregating input data according to a hierarchical specification, or structure, according to some example embodiments.

FIG. 7 discloses an example algorithm for training a hierarchical model, according to some example embodiments.

FIG. 8 discloses an example inference method for predictions obtained with a trained model using validation data FIG. 9 discloses an example algorithm for predicting labels, based on input data, using a hierarchical modeling approach, according to some example embodiments.

FIG. 10 discloses an example approach for copying a hierarchical specification and assigning it to attributes of a benchmark model, according to some embodiments.

FIG. 11 discloses an example algorithm for comparing the performance of a hierarchical model to a benchmark model, according to some example embodiments.

FIG. 12 discloses an example algorithm for computing hierarchical performance metrics of predicted data, based on given hierarchical specifications, according to some example embodiments.

FIG. 15 discloses example experimental results.

DETAILED DESCRIPTION OF SOME EXAMPLE EMBODIMENTS

Figure 1:
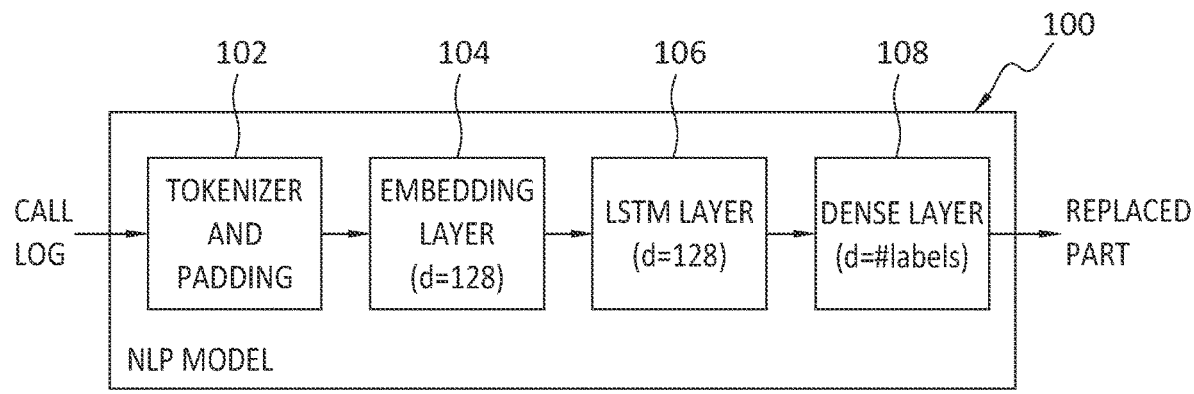
FIG. 1 discloses a simplified NLP model, such as may be employed in example embodiments.

Embodiments of the present invention generally relate to predicting the need for parts replacement, such as in computing components for example. More particularly, at least some embodiments of the invention relate to systems, hardware, software, computer-readable media, and methods for digital repair prediction models that may overcome class imbalance problems, and may work effectively with small sample sizes.

In general, example embodiments of the invention embrace a hierarchical classification modeling technique that takes an effective approach to solve, or at least reduce, class imbalance. Instead, at least some example embodiments rest on the aggregation of raw data into artificial classes, and the breakup of the part failure prediction into multiple hierarchical steps that (1) balance the data, and (2) make classification simpler by reducing the number of classes to be predicted in each step.

Example embodiments may also allow the user to decide whether to iteratively follow through the hierarchical classification model predictions, taking into account benchmark metrics of a traditional modeling approach. Example embodiments may serve to resolve similar class imbalance issues existing in other domains beyond repair predictive maintenance. Moreover, experiments by the inventors indicate that example embodiments may improve the coverage and performance metrics of under-represented classes, while at the same time allowing the user to choose the best prediction at each step of the model predictions.

In some example embodiments, a hierarchical classification model structure may be defined and implemented that receives, as input, user log data concerning various problems, such as hardware problems, experienced by a user. The hierarchical classification model structure may be configured to implement artificial classification labels, or classes, that may tend to aggregate input data, such as user log information, in such a way that class imbalances, that is, imbalances between different classes of hardware for example, are reduced or eliminated, relative to classifications generated by benchmark approaches. The resulting hierarchical classification model may then be trained using a validation dataset that may be a part of the input data. The output of the hierarchical classification model may be a set of predicted labels, that is, classifications of hardware that are predicted, or may be predicted, to fail. Thus, by way of reference to the earlier example of the HDMI connector and the motherboard, an example embodiment may generate separate labels for the HDMI connector and the motherboard so that failures can be more particularly predicted, and dealt with.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, some embodiments may overcome the problem of class imbalance digital repair class labels. Some embodiments may resolve the problem of sample sizes in datasets used to predict equipment failures. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

The following is a brief overview relating to example embodiments of the invention. This discussion is not intended to limit the scope of the invention, or the applicability of the embodiments, in any way.

Issue resolution in computer systems may be improved with prediction models that output which system part(s) should be replaced given a set of issue symptoms. Such issue resolution may result in significant savings for a business entity or other organization. In one approach, a prediction model may receive as input the transcription of the call logs between the customer with a broken system and a support agent. From the raw, or processed, text of the call logs, a Natural Language Processing (NLP) model learns, in a supervised manner, how to associate terms or sequences of text in the logs with class labels related to parts replaced. At inference time, the call log from a customer may be fed into the model and the model may predict which parts of the customer system should be replaced. Example embodiments may deal with a practical problem of the digital repair prediction solution, which is the inherent imbalance of parts replaced. Such imbalance problem may lead to modeling imprecisions and, thus, less-than-ideal prediction accuracy.

In more detail, example embodiments embrace, among other things, a hierarchical modeling technique that may aggregate raw data into artificial classes and breaking the prediction into multiple hierarchical steps that try to (1) balance the data, and (2) make classification simpler by reducing the number of classes to be predicted in each step.

As noted earlier, aspects of some example embodiments may employ NLP on data, such as the call logs between a customer with a broken system and a support agent. From the raw, or processed, text of the call logs, the NLP model, which may be based on embedding and LSTM (long short-term memory) layers of high dimensionality, may learn, in a supervised manner, how to associate terms or sequences of text in the logs with class labels related to parts replaced. A simplified architecture of such an NLP model is disclosed in FIG. 1. This simplified architecture and approach may be referred to herein as the 'benchmark' model.

In particular, the example architecture, which may take the form of an NLP model 100, may be configured to receive, as input, call log information, and generate, as output, an indication as to which part, or parts, should be replaced. To these ends, the example NLP model 100 may include various modules such as, but not limited to, a tokenizer and padding module 102, embedding layer 104, LSTM layer 106, and dense layer 108. At inference time, a repair technician may provide the call log from a customer as input to the NLP model 100, and expects the NLP model 100 to predict which parts of the customer system should be replaced. In some implementations, the NLP model 100 may reach ~70% accuracy on test datasets.

B. Aspects of Some Example Embodiments

As noted earlier, example embodiments may embrace a hierarchical modeling technique that relies on aggregating raw data into artificial classes and breaking the prediction into multiple hierarchical steps. Example embodiments may also include (1) a validation operating throughout the model training process that may aim to indicate whether the hierarchical modeling approach improves over another approach, and (2) an inference operation that may enable the user to decide whether to accept the prediction of the hierarchical model at any point of the iterative, hierarchical inference process.

Figure 2:
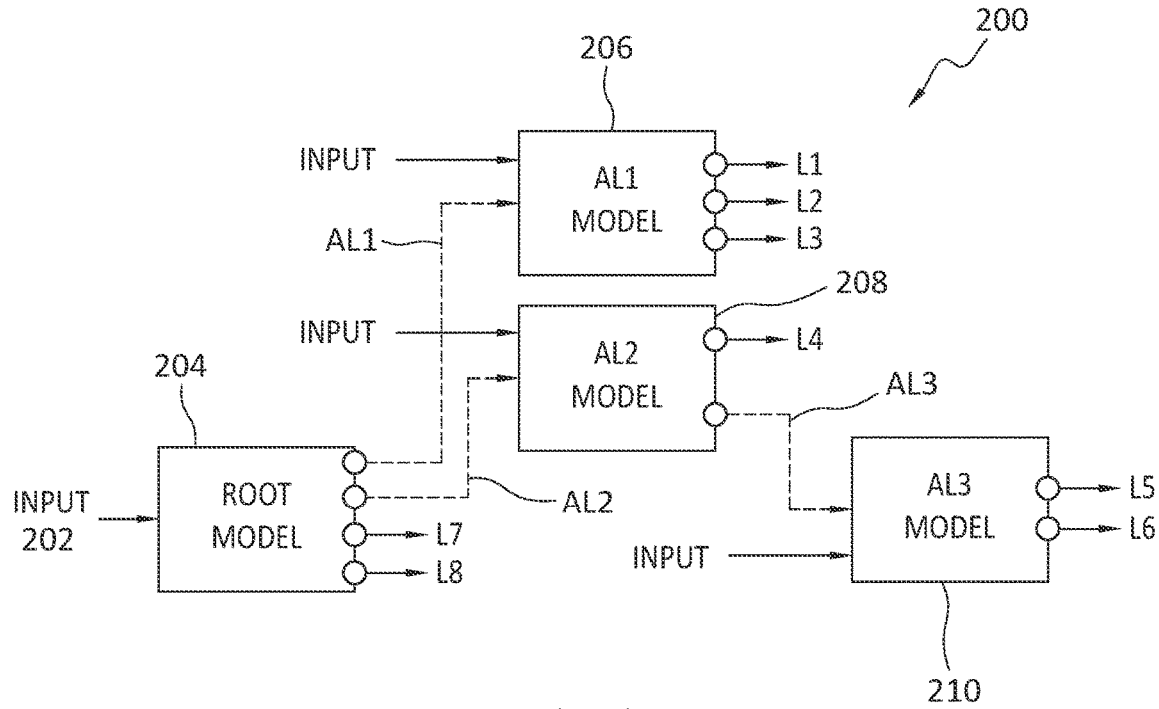
FIG. 2 discloses an example hierarchical modeling structure, according to some example embodiments.

Thus, at least some embodiments may operate to generate a hierarchical classification modeling structure, which may be referred to herein as 'HCMS' or simply as a 'hierarchy,' an illustrative example of which is denoted at 200 in FIG. 2. In general, the desired input 202, such as user call logs, may be provided to a root classification model 204 that receives and classifies the input 202 into one of a set of known class labels {L1, ..., L8}. To illustrate with a simple example, input in the form of an NLP-processed user call concerning a display problem that the user is having, might be classified with the class label 'display.' Note that in FIG. 2, and as discussed in detail below, the broken lines indicate a processing order conditioned on the output label, while the solid lines indicate data flow.

As shown in FIG. 2, some of the labels may represent aggregations of other labels. To illustrate, the AL1 label that is output by the root model 204 represents an aggregation of labels {L1, L2, L3}, as indicated by the outputs of the AL1 model 206 Similarly, the AL2 label represents an aggregation of {L4, AL3}, as indicated by the outputs of the AL2 model 208. Finally, the AL3 label represents an aggregation of {L5, L6}, as indicated by the outputs of the AL3 model 210.

With continued reference to the example of FIG. 2, in an example method according to some embodiments, the input 202 may be first provided to the root model 204, which classifies the input into labels {AL1, AL2, L7, L8}. If the result of the classification of that input is label AL1, the HCMS 200 specifies that the input labeled AL1 is further provided by the root model 204 to the AL1 model 206. The AL1 model 206 may then classify the input into one of the original labels {L1, L2, L3}. If the root model 204 classifies the input with the synthetic classification, or aggregation, AL2, the input labeled AL2 will be further provided to the AL2 model 208, which may then label the input as corresponding to the original label L4. At the AL2 level, the input may also be classified with label AL3, which represents an aggregation of labels {L5, L6}. If the input is classified as AL3, the same input will then be provided to the model trained at the AL3 level 210 on the figure. Finally, the model 210 will classify the input into one of the original labels {L5, L6}, finalizing the classification of the input.

With regard to the foregoing, it is noted that the classifications of the input into synthetic, that is, aggregated, labels 'AL1,' 'AL2,' and 'AL3' are classifications that may be created by the HCMS 200, while the original labels L1 ... L8 may be determined before input 202 is provided to the HCMS 200, and may be referred to the original labels of the problem. To illustrate, 'AL1' may be a generic 'LCD' label that applies to various LCD components, each of which may correspond to one of the original labels L1, L2, or L3. Thus, the use of the generic 'LCD' label by the HCMS 200 may enable the HCMS to funnel all LCD-related components to the AL1 model for further classification as belonging to one of original labels L1, L2, or L3.

As is also apparent from the example of FIG. 2, each of the components implicated by the input 202 may, ultimately, be assigned one of a group of original labels. Put another way, after the input 202 has traversed the HCMS 200, all of the input may have been assigned one of the original labels. Thus, once a piece of input 202 has been assigned one of the original labels, no further aggregation of labels pertaining to that piece of input 202 may be needed, or performed. Finally, it will be apparent that the HCMS 200 may enable a granular approach to the assignment of labels to various components and, as such, may enable more specific and accurate insight into which particular component, or components, should be replaced.

For a user, an HCMS, such as the HCMS 200, may be completely transparent. That is, a user may simply provide the input 202 and receive, as output, classifications and recommended repairs, without necessarily being involved with, or aware of, processes taking place within the HCMS 200. However, some embodiments may provide a user-interactive inference mechanism that may allow, for example, the user to follow the classification results as the HCMS 200 is traversed, so that the user may, for example, evaluate the performance of the HCMS 200 at any point. As will be apparent, the basic structure of the HCMS 200 may support any number of aggregation levels.

B.1 Train, Validation, and Test, Data

Methods according to some example embodiments may employ a data science approach in which labelled data, that is, data which has already been labeled with one of a group of original labels, is separated into training, validation, and test data subsets. The training, validation, and test data may also be referred to herein, respectively, as a training dataset, a validation dataset, and a test dataset. Example methods may include a training phase, where the HCMS is trained, a validation phase, where the trained HCMS is compared with another model previously trained according to a benchmark approach, and a test phase, where the trained HCMS is applied on unseen data, for inference only.

The sizes of the subsets of data may be arbitrary, and problem-dependent, but in some embodiments at least, the training dataset may be the largest. Some particular embodiments may use about 73% of the original dataset for training, about 12% of the labeled dataset for validation, and about 15% of the labeled dataset for testing. In some embodiments, none of the validation and test data will be seen during training. The test dataset, in particular, may only used for measuring inference performance.

Figure 3:
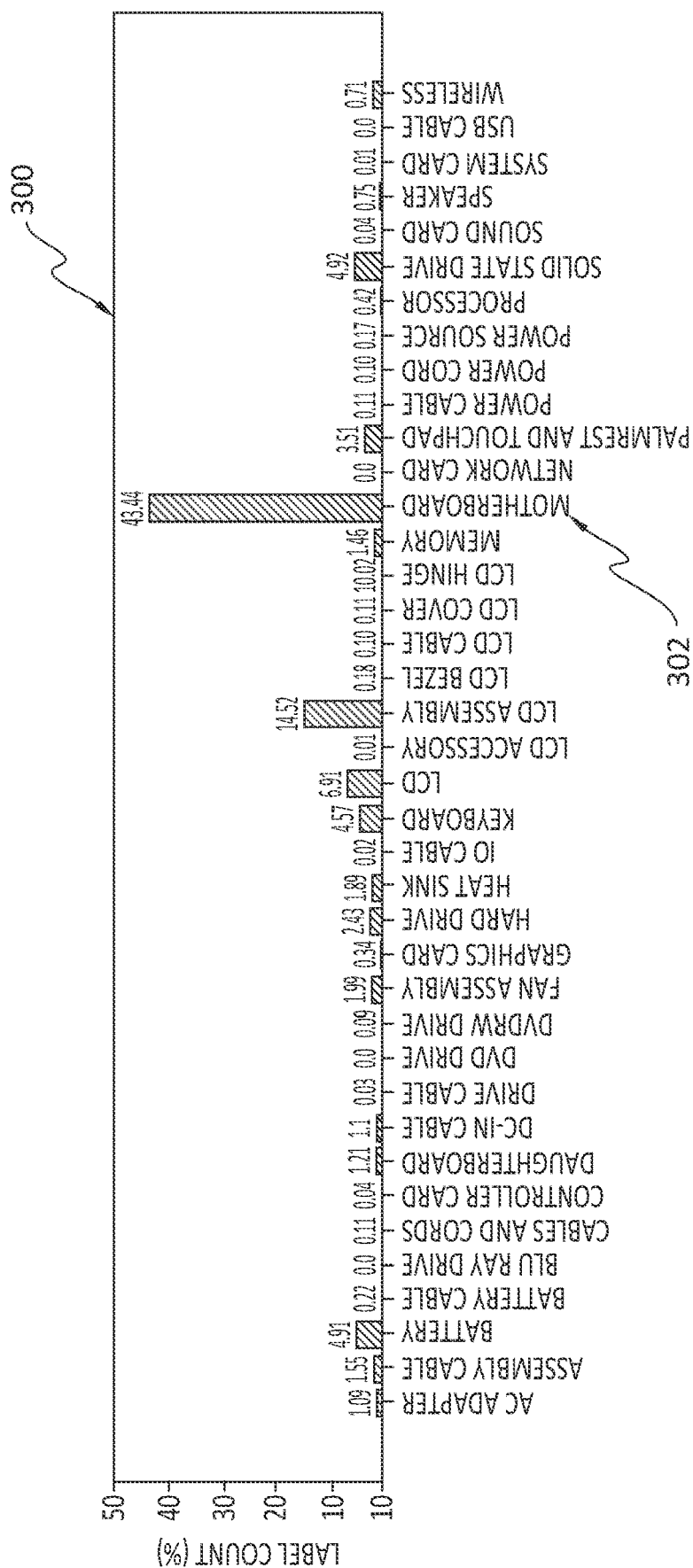
FIG. 3 discloses a distribution of class labels that illustrates the class imbalance problem addressed by some example embodiments.

Turning now to FIG. 3, a graph 300 is disclosed that illustrates an example distribution of class labels in for a dataset relating to repairs of user equipment. In general, the graph 300 illustrates the problem of class imbalance to which example embodiments may be directed. In more detail, the original input labelled data may comprise two columns. The first column, which may be referred to as x_column, may contain input data, such as the pre-processed call logs between customers and support agents. The second column, which may be referred to as label_column, may identify the particular hardware part, or parts, replaced in the customer system. Such information may be collected ex post facto and used as a ground-truth class label for training purposes. Each sample of this dataset, that is, the original input labeled data, thus represents a pair {call log, replaced part}.

The particular example of FIG. 3 shows the distribution of replaced parts, that is, class labels, in a dataset such as may be used by example embodiments. As shown, the class label 302 'motherboard' is the dominant label, having been applied to about 43% of the data, while most other labels are under-represented. In fact, it may be assumed in some cases at least, that if one or more labels are overrepresented, one or more other labels may be underrepresented. The example of FIG. 3 thus provides evidence of the type of class imbalance which may be resolved, or at least reduced, by example embodiments. In the illustrative example of FIG. 3, the train, validation, and test, datasets all have similar distributions.

B.2 Specifying Hierarchical Aggregations

In example embodiments, 'aggregation' refers to a process by which samples of different classes are collectively represented by a new arbitrary class label. An example of such aggregation might be to replace the various class labels for LCD components "lcd assembly," "lcd bezel," "lcd cover," "lcd hinge" with a single new label "LCD" to represent all repairs that relate to LCD. The choice of labels to aggregate may depend, for example, on some heuristics, or on domain knowledge, that is, knowledge by a user and/or a computing entity, of various components that may be related to each other in some relevant way, as in the aforementioned LCD example.

Figure 4:
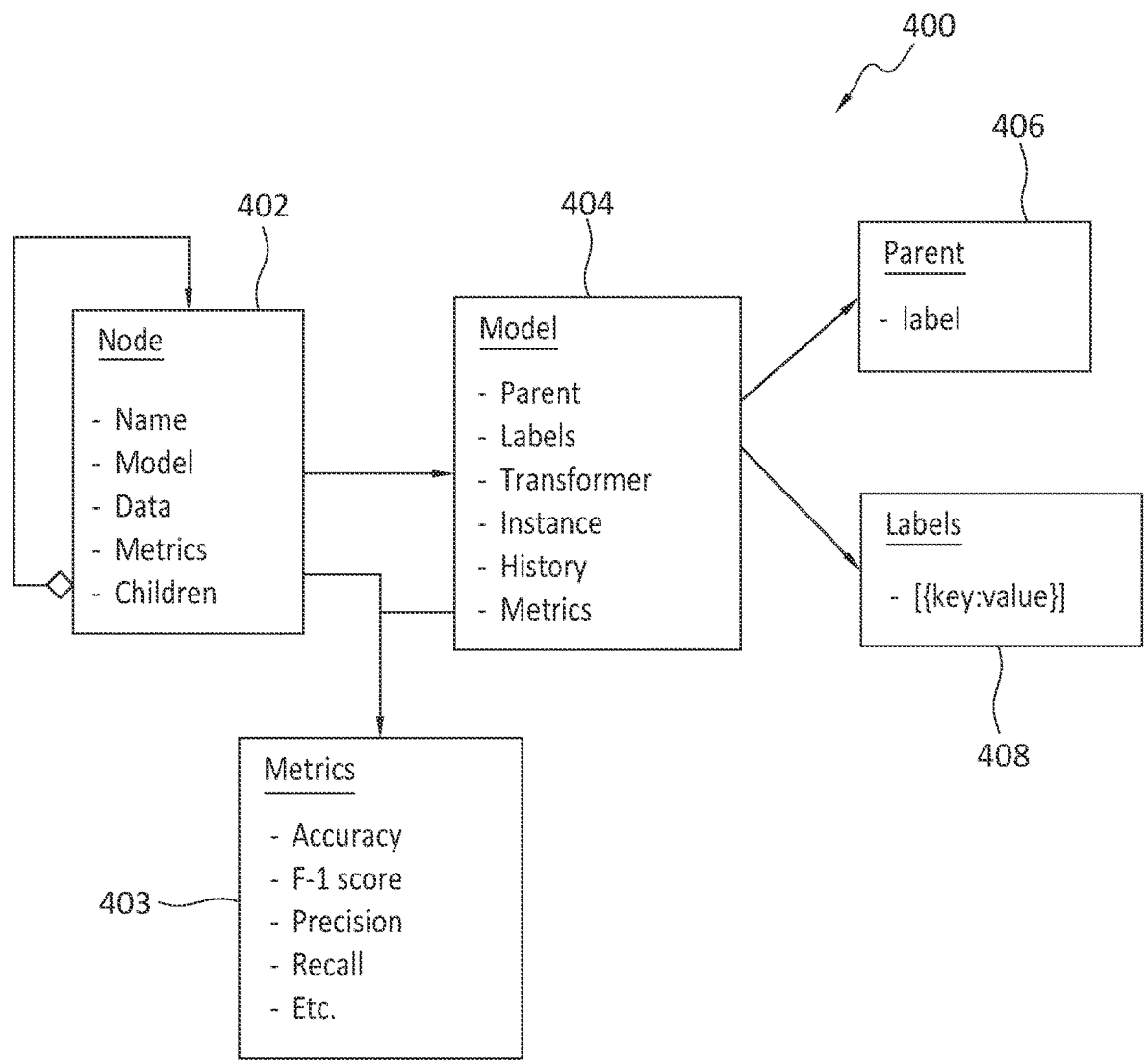
FIG. 4 discloses an example data structure to support a tree-like structure for aggregations and hierarchical modeling, according to some example embodiments.

Embodiments may define and implement a tree-like recursive structure that may be used to specify how aggregations should be implemented. A node in such a tree-like structure may be configured as shown in the example structure disclosed in FIG. 4 which discloses, in particular, a node structure 400 that may be used to define aggregations and implement hierarchical modeling.

The main structure 402 of the node stores a Name to identify the node, the aggregated Data for training a Model at that node, the parameters of such model, performance Metrics of the trained model, and a list of Children nodes. The main structure 402 may also include a metrics grouping 403 that defines various metrics, including an F-1 score as discussed below, relating to predictions and/or aggregations involving the main structure 402.

The Model field 404 may be further broken down and may store the trained model Instance, the specifications of the class label aggregations to be carried out at the node, and a pointer to the Parent model 406 if the node represents a dependent, or child, model.

The Labels field inside the Model 404 may contains a list of {key: value} pairs, as shown by the Labels 408, where each key is the label resulting from an aggregation, and each value is a list of labels to be aggregated into the label indicated by the key. In the "LCD" example above, the {key: value} pair would be {"lcd": ["lcd assembly," "lcd bezel," "lcd cover," "lcd hinge"]}.

The Parent field in the Model 404 indicates, in a child node, the label of the parent model to which the labels of the child correspond. Supposing the parent model was trained with the aggregate label "lcd," it may immediately be inferred that the child model will be trained with the original labels "lcd assembly," "lcd bezel," "lcd cover," and "lcd hinge."

Finally, the Children field in the node structure 402 represents the list of models that derive from the aggregations implemented at that node. The Children field and associated functionality may thus allow the construction of a recursive structure to represent any number of aggregations and hierarchical relationships.

As an example, the example code (in Python) 500 shown in FIG. 5 is directed to an example configuration of a hierarchical modeling approach according to some example embodiments. Particularly, the example code 500 represents a hierarchical structure with two aggregations at the root level. The original label "motherboard" is preserved. Next, the "lcd" label represents the aggregation of labels "lcd," "lcd assembly," "lcd bezel," "lcd cover," and "lcd hinge." Finally, a special label "others" may be created to aggregate all labels that were not explicitly specified at that level.

The two aggregations at the root node imply the creation of two child nodes of the root node, since each portion of data may ultimately be assigned a specific label and not simply an aggregation. Put another way, each aggregation may be thought of as being split into one or more original labels which are, by definition, lower in the hierarchy than the aggregation that contains them and, as such, one or more child nodes must exist to which those original labels may be applied.

The first aggregation at the root node specifies the labels for the model that will be derived from label "lcd" at the root level. This is specified in the Parent field of the first child node. In this child node, no other aggregations may be needed since the first aggregation comprises only original labels. A special label "all" may be used to preserve all labels that were aggregated at the parent level into label "lcd."

A similar configuration may be implemented for the second aggregation, to which the second child of the root node corresponds. The node specifies the labels for the model that will be derived from the label "others" at the root level. Once again, no other aggregations need be done in this example. The special label "all" may thus be used to preserve all labels associated with "others" at the parent level. This hierarchical configuration may be used throughout the data preparation, hierarchical training, hierarchical prediction, and benchmarking.

B.3 Hierarchical Data Preparation

In general, the data preparation operations may involve performing the aggregations on the input data, according to the hierarchical specifications outlined earlier herein. Example data preparation operations may involve the use of a recursive algorithm whose objectives are to (1) transform the labels according to the configuration provided through the hierarchical specification, and (2) progressively filter the input data as the algorithm traverses the hierarchical specification from the root to the leaves.

The core logic of an example data preparation algorithm 600 is shown in FIG. 6 (in Python). Particularly, FIG. 6 discloses a recursive algorithm 600 that may be executable to aggregate input data according to a provided hierarchical specification, an illustrative example of which is disclosed at 200 (HCMS) in FIG. 2.

In line 3 of the algorithm 600, the first objective, that is, aggregation of the labels, is achieved for the input node, which may be a root node. The field Data of the node may receive a modified version of the input data, with aggregations executed as specified in the node. Next, the node children, if any, may be processed. For each child node, the parent label may be obtained. The parent label (i.e., the key) may thus be searched at the parent node and the labels associated with it (i.e., the values) retrieved. In line 17 of the algorithm 600, the labels retrieved may be used for the second objective of the algorithm, namely, to filter the input data according to the aggregation labels. The child may then be then recursively processed, and the algorithm may continue recursively until the leaves of the structure, when no more children are found. With reference again to FIG. 2, it can be seen that when the example HCMS 200 has been fully traversed, all of the input data is ultimately assigned one of the original labels L1 . . . . L8, that is, there are no remaining aggregation labels to be processed.

Continuing now with the algorithm 600, the function make_node_data, called in line 3, traverses the {key: value} pairs of the Model.Labels field in node and applies the aggregations it specifies. At the "root" level, considering the example of FIG. 5 in the previous section, the example of the function make_node_data will: (1) leave unchanged all data samples with label "motherboard"; (2) replace with "lcd" the label of all data samples having labels in the set {"lcd", "lcd assembly", "lcd bezel", "lcd cover", "lcd hinge"}; and (3) replace with "others" the label of all remaining data samples that do not fall in either the "motherboard" or "lcd" classes. In addition, the function replaces the None keyword with the set of labels associated with "others" at the root level.

At the "LCD" level, the function make_node_data of the example algorithm 600 receives a filtered version of the data set created at the parent ("root") level. As seen above, this data set will only contain the samples associated with the parent "lcd" label. Since the "LCD" level does not specify any additional aggregations, the keyword "all" was used to preserve all the original sample labels. The function make_node_data also replaces the None keyword with the original set of labels. Similar reasoning is employed at the "others" level. Namely, the function make_node_data will receive a filtered version of the parent data set, containing samples associated with the parent "others" label. Again, the keyword "all" was used to preserve the original sample labels at this level.

B.4 Hierarchical Model Training

At this stage in example embodiments, a prediction model at each node of the hierarchical specification may be trained, using the data created for that prediction model in the hierarchical data preparation process. The core of the training algorithm may follow a very similar logic to the logic in the algorithm 600 used to create the aggregated data sets. Namely, nodes may be trained recursively, from the root of the hierarchical specification to the leaves, as shown in FIG. 7 which discloses, in particular, an example recursive algorithm 700 that may be used to train a hierarchical model.

The example algorithm 700 may start, in line 14, by training the model associated with the input, or root, node of the hierarchical specification. The train_node_model function will use the data associated with the node, retrieved from field Data, and the input and output variables given by the x_column and label_column variables, respectively. The specificities of the training may be problem-dependent. Here, example embodiments may employ the same HCMS and training procedure noted in the discussion of FIG. 1 across all nodes of the hierarchical specification. In other embodiments, a dedicated model may be created for each node.

The train_node_model function may return (1) a transformer, which may prepare the data for the model, and may be required at inference time as well, (2) a trained model instance, which may also be used at inference, (3) a history of the training process, and (4) performance metrics obtained in validation steps, if any. The latter two, that is, (3) and (4), may be particularly useful for performing analyses and gathering statistics. The values may be stored in the Model field of the current node. Next, the children of the current node may be processed. The training may proceed recursively until no more children are found. Eventually, each node of the hierarchical specification may have a trained model instance associated with it.

B.5 Hierarchical Predictions and Benchmarking

One reason for a hierarchical modeling approach to potentially increase prediction performance is that, at each level, a simpler problem may be solved in comparison with the benchmark modeling approach. A simpler problem refers to a problem with relatively fewer class labels to be learned by the model, and a problem with more balanced datasets, both resulting from aggregation operations, examples of which are discussed in connection with FIG. 7.

Nonetheless, if several class labels are severely underrepresented in the original data, filtered data sets at the lowest levels of the hierarchical specification may have fewer samples than required for a "robust" model to be trained. As a result, improvements obtained at the highest level of the hierarchy may be lost completely as the lowest levels of that hierarchy are reached.

Thus, at least some example embodiments embrace a mechanism to compare the performance of the hierarchical modeling approach with a benchmark modeling approach. Such embodiments may store performance metrics and benchmark the hierarchical model to indicate whether, at any point of the hierarchy, there is any potential to improve a benchmark modeling approach. The stored information may be used later in an interactive inference step to help users of the model determine whether the hierarchical modeling will be beneficial in resolving their problem or not.

B.5.1 Predictions

In order to obtain predictions, some embodiments of the invention may first train a model using a benchmark approach that may involve, for example, using the complete data set without any label aggregations. To this end, example embodiments may employ the training procedure outlined herein in the discussion of FIG. 1, so as to obtain a trained model ready for predictions on test data.

The test data used for this model may be a validation data set, such as that obtained in the data splits discussed herein at B.1. In brief, in the benchmark approach, the prediction function of the model may be invoked with some input data, as shown in FIG. 8. The function returns, for every sample in the validation data set, the predicted label as a function of the input data. Particularly, FIG. 8 discloses an algorithm 800 for obtaining predictions with a trained model on validation data.

Next, embodiments may operate to obtain predictions of part replacements with the hierarchical model. Thus, embodiments may employ a recursive algorithm that calls a prediction function, such as that implemented by the algorithm 800, for each node of the hierarchical specification, using the respective trained model for the node. Thus, and in contrast with benchmark approaches, example embodiments may perform prediction analyses at one or more individual nodes of a hierarchical structure, while the benchmark approach considers only the dataset as a whole when generating a prediction as to whether or not a part should be replaced. Put another way, example embodiments are directed to a recursive prediction process that may prepare the data for each model and analyze the predicted labels to decide whether the recursion will proceed to the next levels. This is illustrated in a function predict_hierarchical, an example of which is disclosed in FIG. 9. Particularly, FIG. 9 discloses a recursive algorithm 900 which is executable to predict labels from input data using a hierarchical modeling approach according to example embodiments.

The example algorithm 900 may start, in line 4, by predicting the labels of the input data samples using the trained model associated with the input node. When the function predict_hierarchical is invoked for the first time, that is, for the root node, the complete validation data set may be passed to that function as an argument. Since the model of the root node was trained with the label aggregations specified for the root node, the predicted labels must be one of those in the set of aggregate labels.

In general, and as noted elsewhere herein, a node typically has as many children as the number of aggregate labels specified in the aggregation. The hierarchical prediction algorithm 900 may traverse the children of the current node and, for each child node, obtain the parent aggregation label associated with that child node. The algorithm 900 may then filter the predicted labels and keep only those predictions that correspond to the aggregate label, in line 18 of the algorithm 900. If the resulting data set is not empty, the algorithm 900 may proceed recursively to the child node, in line 21.

As the algorithm 900 traverses the hierarchical structure, it replaces aggregated labels predicted at the parent node with the original labels of the problem space. Following the example that this disclosure has been using, the hierarchical prediction algorithm 900 will yield, at the root level, predicted labels in the "motherboard", "lcd" and "others" set. For every data sample predicted as "lcd," the algorithm 900 will recursively proceed and yield, using the trained model of the "LCD" level of the hierarchy, predicted labels within the set {"lcd," "lcd assembly," "lcd bezel," "lcd cover," "lcd hinge"}. Similar reasoning is applied to the samples predicted as "others" at the root level. Since the "LCD" and "others" levels have no additional children, the recursive prediction algorithm 900 will stop after processing them.

The predict_node function call in line 4 of the algorithm 900 invokes the same prediction function used in the prediction of the benchmark model disclosed in FIG. 8. Instead of using the benchmark model 800 and the input data, the predict_node function receives the model associated with a node and the respective data set, which may have been filtered in a prior recursive step, as described above. The predictions obtained at each level may be merged into an output list of predicted labels, which respects the order of the samples in the input data set. This operation is performed in line 5 of the algorithm 900.

B.5.2 Benchmarking

Using procedures, such as those described in connection with FIGS. 8 and 9, embodiments may operate to compare the performance of the hierarchical approach with the performance of the benchmark modeling approach. One way of comparing these two approaches is to simply compute prediction metrics using the complete set of predicted labels of each approach and the ground truth labels of the validation set. For instance, embodiments may compare the accuracy score and/or the F-1 score, that is, a measure of the accuracy, of the predictions.

Nonetheless, some example embodiments may also leverage the hierarchical specification to do more fine-grained analyses and identify the extension to which the hierarchical modeling approach is beneficial at any level of the hierarchy. This approach may be challenging, however, at least in that the benchmark approach does not employ a hierarchical specification. Rather, as noted elsewhere herein, the benchmark approach operates with a complete set of original labels, without any definition, or use, of aggregations such as are employed in example embodiments of the invention.

The challenge posed by the benchmark approach may be mitigated by creation of a copy of the hierarchical specification used for example embodiments of the hierarchical modeling approach and apply that copy in a "bottom-up" manner to the predictions obtained with the traditional modeling approach. Namely, after training the benchmark model, embodiments may proceed as illustrated in FIG. 10 which discloses, particularly, an algorithm 1000 executable to copy a hierarchical specification and assign, to that copy, attributes of the benchmark model. Note that, for simplicity, example embodiments may assign the parameters of the benchmark model to the root of the baseline specifications. This structure, along with the hierarchical specification of the hierarchical model may then be used to calculate and compare the performance metrics of the hierarchical and benchmark models. This may be performed by the compare_ hierarchical function implemented by the algorithm 1100 disclosed in FIG. 11, which is an algorithm that is executable to compare the performance of an instance of the hierarchical model with a benchmark model.

Particularly, given a hierarchical specification of an instance of a trained hierarchical model, a hierarchical specification for an instance of a trained traditional model, and a validation data set, the compare_hierarchical function may start by running the predictions for the hierarchical model as described in B.5.1 herein, in line 2. Next, the parameters of the traditional model may be obtained from the benchmark hierarchical structure, and predictions from the traditional model are obtained in the same way, until line 6 of the algorithm 1100. With the predictions, the algorithm 1100 computes performance metrics independently for each modeling approach using the predicted labels, the ground truth labels, and the hierarchical structures, in lines 12 and 14, respectively, of the algorithm 1100. Lastly, the algorithm 1100 may check if the performance metrics of the hierarchical model instance improve the metrics of the benchmark model, in line 16 of the algorithm 1100. The following discussion addresses the details of the functions metrics_hierarchical and improve_hierarchical, to explain how the performance metrics are collected and how the models are compared.

Particularly, FIG. 12 shows an example implementation of a metrics_hierarchical algorithm, denoted at 1200, that is executable to compute hierarchical performance metrics of predicted data, according to given hierarchical specifications. The algorithm 1200 may receive, as input, (1) a node from a hierarchical specification, (2) ground truth labels from a validation data set associated with the node, and (3) predicted labels associated with those ground truth labels. The first operation of the example algorithm 1200 is to perform label aggregations in a similar way as explained in the discussion of FIG. 6. Namely, from lines 8 to 17 of the algorithm 1200, labels associated with the Model.Labels field of the node are aggregated according to the {key: value} pairs found in that field. The difference is that the aggregations are done both for the predicted and ground truth labels, so that the aggregations can be compared with each other.

Next, in line 20 of the algorithm 1200, performance metrics for the node are computed using the aggregated ground truth and predicted data. The specific metrics to be computed are problem-dependent, for example, accuracy score, F-1 score, precision, and recall. The obtained metrics may be stored in a Metrics field of the node. The algorithm 1200 may then proceed to process the children of the current node. The operations are similar to those in other algorithms disclosed herein. That is, the input data, namely, predictions and ground truth, are filtered according to the aggregated label of the parent node, and the algorithm 1200 recursively processes the children if the filtered data is not empty.

Figures 13, 14:
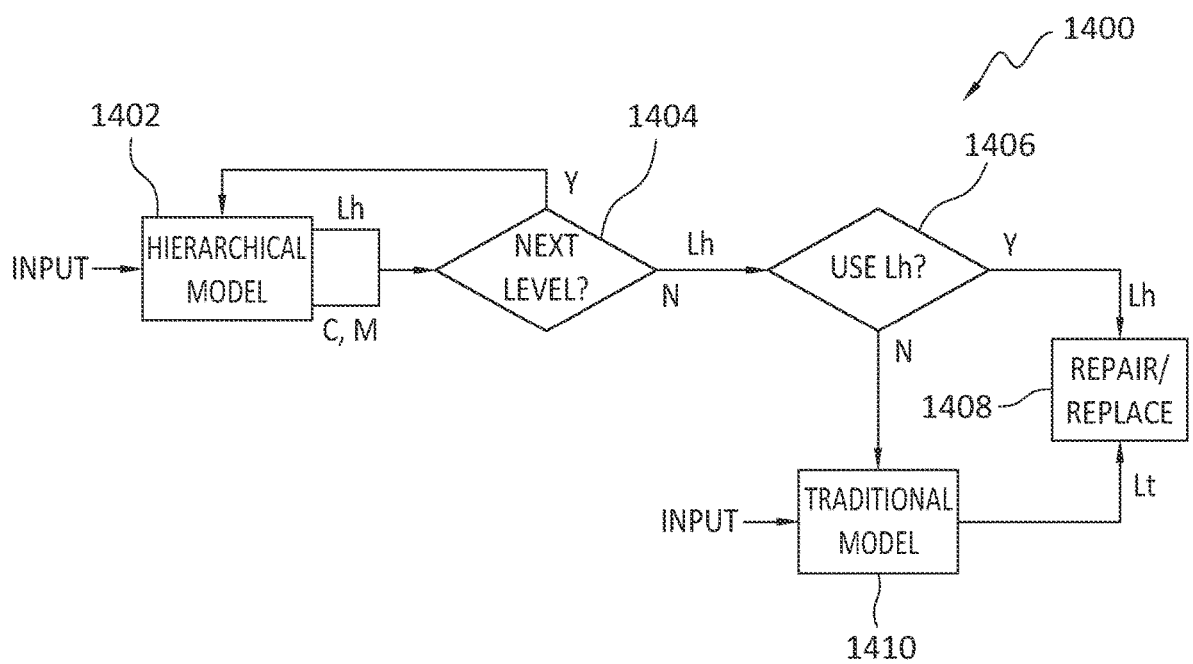
FIG. 13 discloses an example algorithm for determining whether a hierarchical model improves on the performance of a benchmark model, relative to a given performance metric, according to some example embodiments.
FIG. 14 discloses an example decision process for using, or not, labels predicted by a hierarchical model, according to some example embodiments.

Now that validation performance metrics for the hierarchical model have been collected, and a hierarchical representation of metrics for the benchmark model generated, embodiments may compare whether the hierarchical approach improves the benchmark model at any point of the hierarchy. To this end, example embodiments include a recursive algorithm that traverses both hierarchies in parallel and compares the desired metrics at every node. FIG. 13 shows the algorithm, specifically, a recursive algorithm 1300 which serves to check whether a hierarchical model improves the benchmark model, relative to a given performance metric.

The function improve_hierarchical of the algorithm 1300 starts, in line 2, by checking any improvements of the hierarchical model at the current node of the architecture. In this embodiment of the invention, the field ImproveBenchmark holds a True/False flag indicating if any improvement was achieved relative to the given metric. In the example of FIG. 13, the algorithm 1300 may check a global F-1 metric of the predicted labels.

Assuming the structure of the hierarchical model instance and the structure of the hierarchical representation of the benchmark are mirrors, the algorithm 1300 may proceed to recursively process the children of the current node. In the end, embodiments may operate so that every node of the hierarchical model instance indicates whether the aggregation done at that node improved the equivalent simulated aggregation of the benchmark. This information may be useful for statistics, analyses, and inference, as described in more detail below.

B.6 Hierarchical Inference

The hierarchical inference process may be similar to the prediction mechanism described in B.5.1, above. In effect, the same function predict_hierarchical is invoked for the hierarchical inference process as for the aforementioned prediction mechanism. A difference is that example embodiments of the hierarchical inference process may implement an interactive mechanism that allows the user of the prediction model to decide until when it is beneficial to traverse the hierarchical model. Namely, if the label predicted for a test case corresponds to an aggregation, the choice may be to apply the corresponding child model to the test case and obtain a prediction within the set of dependent labels. However, proceeding recursively may only be beneficial if the hierarchical model has been shown to improve the traditional model during the validation phase.

Thus, at any point across the hierarchical predictions, example embodiments may display the predicted labels to the user along with a confidence score C of the prediction, and historical performance metrics M, comparing the hierarchical model and the benchmark. The confidence score C may be obtained in various ways. In some implementations, this is typically derived from a softmax output of a DNN (Deep Neural Network) associated with the LSTM model referred to in the discussion of FIG. 1. Such a confidence score C may be a real number in the interval [0, 1], where 1 indicates the highest confidence, and 0 indicates no confidence. Based on the displayed information, the user may decide to continue with the model predictions, stop and leverage the predicted label at the latest level, or abandon the hierarchical model in favor of the benchmark model. This flow is shown in FIG. 14, which discloses a method 1400 for a decision process as to whether or not to use labels predicted by a hierarchical model. The method 1400 may begin at 1402 where the hierarchical model is invoked with the input data. The hierarchical model may assess the input data to generate various outputs including, for example, the label Lh predicted by the hierarchical model, the confidence C of that prediction, and the label Lt predicted by the benchmark/traditional model 1410. Note that Lt may be provided to the hierarchical model by the benchmark/traditional model. Based on these inputs, a user may then have to decide 1404 whether or not to proceed to the next level of the hierarchy. If so, the method may return to 1402. If not, the user may then have to decide 1406 whether or not to use the label Lh generated by the hierarchical model. If the user decides 1406 to use the label Lh generated by the hierarchical model, the item to which that label Lh corresponds may then be repaired/replaced 1408. On the other hand, if the user decides 1406 not to use the label Lh generated by the hierarchical model, the method 1400 may proceed to 1410 where the label Lt that was assigned by the benchmark/traditional may be used, and the item to which the label Lt corresponds may then be repaired/replaced 1408.

C. Further Discussion

As will be apparent from this disclosure, example embodiments may provide various useful features and functionalities, some of which are discussed hereafter. It is noted that these examples are provided by way of illustration and are not intended to limit the scope of the invention in any way.

For example, embodiments may define and implement a data structure and process to specify hierarchical label aggregations. Particularly, embodiments include a data structure and mechanism that enables the creation of a hierarchical specification that can be used for the creation of hierarchical data aggregations and prediction models for digital repair.

As another example, embodiments may define and implement a hierarchical data processing approach. Specifically, embodiments include a data processing approach for creation of aggregated and hierarchical data sets to be used in hierarchical models. One purpose of the hierarchical data sets is to mitigate imbalance in digital repair class labels.

Further, embodiments may implement a hierarchical modeling approach. This approach may operate to leverage a hierarchical specification and hierarchical data aggregations to train a hierarchical model for digital repair. In particular, embodiments may employ the disclosed aggregation and hierarchical approaches to address class imbalance issues, with parts prediction.

Some embodiments may implement hierarchical prediction and benchmarking operations. An example prediction and benchmarking mechanism according to some embodiments may enable, among other things: (1) the prediction of class labels for digital repair from test/validation data, following the hierarchical model representation and respective label aggregations; and (2) the comparison of the performance of the hierarchical model at inference time with an benchmark modeling approach at any point across the hierarchical structure.

As a final example, embodiments may provide hierarchical inference with decision process. Particularly, embodiments may define and implement an interactive hierarchical inferencing step that leverages the proposed benchmarking and prediction mechanisms. In this step, the user of the trained models, hierarchical and benchmark, can decide whether to proceed recursively across the hierarchical predictions at each level, stop and use the latest predicted label from the hierarchical model, or abandon the hierarchical predictions in favor of the traditional model.

D. Example Experimental Results

The inventors ran the disclosed hierarchical model with the data sets described in section B.1 of this disclosure. The inventors also ran the benchmark model on the same data sets and collected metrics for benchmarking, as described in section B.5. Different hierarchies and aggregation strategies were tested using a combinations of domain expertise and ad-hoc class imbalance resolution approaches.

A first point to note is that the hierarchical model is generally capable of predicting more labels than the benchmark one. While only 20 of the available 39 labels were predicted by the benchmark model, up to 27 were predicted by the hierarchical model in the experiments. This was somewhat expected, since the benchmark model tends not to learn anything about many of the under-represented labels. With the disclosed aggregations of the hierarchical model, those classes have a chance of being trained with specific models that allow such labels to be recognized at inference time which, in turn, may enable better and more granular predictions as to which components should be repaired/replaced.

Another positive aspect of the hierarchical modelling approach is that the confidence of correct predictions, that is, the output score of the predictions of the models, substantially increases with the hierarchical model. For example, as illustrated in the graphs 1500A and 1500B disclosed in FIG. 15, which illustrate a distribution of model confidence scores for correct predictions, the average of the median score per predicted label reached 0.87 for some configurations of the hierarchical model, against 0.66 for the benchmark model. This means that predictions with high scores coming out of the hierarchical model are more common and more likely to be correct than predictions generated by the benchmark model.

Another observed advantage of the hierarchical modelling approach according to example embodiments is that the model trained for each level of the hierarchy can be simpler than the benchmark model. Although this eventually depends on the nature of the data, the inventors were able to remove the LSTM layer completely from the models trained at each level of the hierarchy. In addition, the dimensionality of the embedding layer was reduced by a factor of 8, since it tends to be simpler to separate from 2 to 4 class labels at each level than to separate from the original 39 class labels of the data set. With such changes, the total training time reduced to up to ~72% of the training time of the benchmark model, without any specific optimizations.

In terms of performance metrics, the inventors observed that the hierarchical model achieves roughly the same numbers as the benchmark model for different hierarchies. Note, however, that metrics such as the global accuracy or the global F-1 score only reflect aggregated results. In example embodiments, an inference pipeline is defined and implemented that allows users to evaluate how confident they should be in the prediction of the hierarchical model, versus the prediction of the benchmark model, at any point of the hierarchy. How the users will proceed may depend on business decisions. In some domains, the main objective may be to achieve as high accuracy as possible across all repair parts learned by the model. Since under-represented parts, that is, class labels, may be more difficult to predict, incorrect predictions may lead to the wrong parts being dispatched to the repair centers. This may incur unnecessary shipment costs and longer service lead times, which affect customer satisfaction.

With the disclosed pipeline, a user may select a metric of interest, such as precision for example, for each class label to be predicted. By analyzing the confidence score of the prediction, the user may then choose to stop going down the hierarchy and shipping, as the parts to repair, the prediction of an aggregated label. For instance, an aggregate label representing all cables or all lcd assembly parts may be enough for a repair technician to understand which parts are the most likely to be repaired. In some circumstances, shipping a set of cables to the repair center, knowing that one of them will be used with high confidence, is better than shipping a motherboard that was predicted, with low confidence, as being problematic, since the motherboard is likely more expensive than the cables, and may cost more to ship, install, and test, whereas a cable may simply be connected to the appropriate components.

For example, in one of the tested hierarchical configurations, the root node was trained to predict either "motherboard" or "others." Such a model achieved ~80% of overall accuracy on tested data, which was slightly superior to the aggregated accuracy computed bottom-up for the benchmark model. However, the inventors observed that the recall metric of "others" was consistently higher with the hierarchical model, and the precision metric of "motherboard" was also consistently higher with the hierarchical model. In addition, the mean confidence score of correct predictions of "others" with the hierarchical model was consistently higher with the hierarchical model and roughly the same for correct predictions of "motherboard." Similar behavior was observed across the entire hierarchy, but improvements in precision and recall, as well as other metrics, tended to alternate between the hierarchical model and the traditional model.

The specific metric to be analyzed by the user at each stage of the proposed inferencing pipeline may be business dependent. A voting scheme, such as in an ensemble model, where both the prediction by the hierarchical model and of the traditional model, along with their confidence scores, may also be implemented. In general however, it was observed by the inventors that the hierarchical model is able to improve upon the performance of the benchmark model, even when the performance is considered from different perspectives. All such perspectives may have positive impacts in the prediction of parts to be replaced in a malfunctioning system.

E. Example Methods

Figure 16:
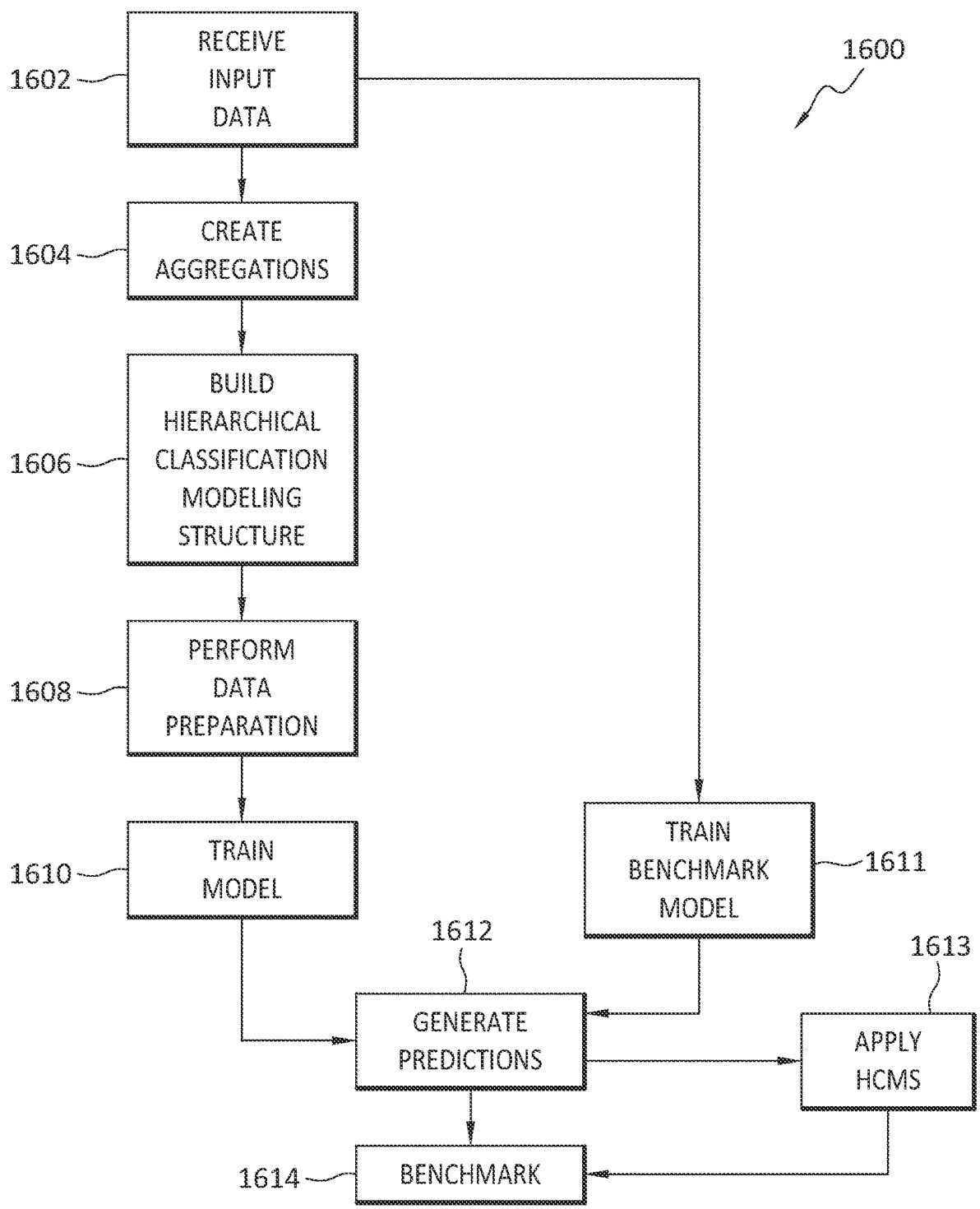
FIG. 16 discloses an example method according to some example embodiments.

It is noted with respect to the disclosed methods, including the example method of FIG. 16, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 16, an example method, denoted at 1600, according to some embodiments is disclosed. The method 1600 may be performed by a variety of different computing platforms including, but not limited to, an application running in a hosted environment, such as an application server for example. In some embodiments, the method 1600 may be performed, for one or more clients, as-a-Service (aaS) in a cloud computing environment. No particular operating environment for the method 1600 is required however.

The method 1600 may begin when input data is received 1602, or otherwise accessed, by a computing platform. The input data may comprise data in form of user logs, which may or may not be pre-processed. The user logs may include data, information, and metadata, concerning interactions between users and a support center for example. The interactions may include information identifying problems that users are having with particular pieces of hardware and/or software, such as computing devices for example.

Based on the input data, aggregations of equipment labels may be created 1604. The aggregations may be arbitrary in nature, and may not necessarily specifically identify any particular piece of equipment. Put another way, an aggregation may be generic as to multiple different pieces of equipment. The type and number of aggregations created 1604 may be a function of the input data.

After the aggregation(s) have been created 1604, a hierarchical classification modeling structure (HCMS) may be constructed 1606 that is configured to classify data using the aggregations, and also using one or more class labels. The HCMS may include a root node, at which input data may be received, and one or more parent and child nodes that are connected directly, or indirectly, to the root node.

Next, a data preparation operation 1608 may be performed that comprises application of the aggregations to the input data, so that all of the input data is classified according to a respective label that is a member of a defined group of labels. The particular way in which the aggregations are applied to the input data may be dictated by the configuration of the HCMS, that is, the configuration and arrangement of the root node, parent nodes, and child nodes.

After data preparation 1608 has been completed, a hierarchical model training process may be performed 1610 which may involve training of a respective prediction model at each node of the HCMS. This training process 1610 may be performed 1610 using the data resulting from the data preparation operation 1608, and the training 1610 may be performed recursively, beginning from the root node out to all the parent and child nodes of the HCMS. As a result of the training process 1610, each node of the HCMS may have a respective trained model instance associated with it.

Additionally, a benchmark model may be trained 1611 using the input data that was received 1602, and that training may be performed based on the original labels. That is, the benchmark model training 1611 may not use any aggregated, or synthetic, labels.

Once the hierarchical model has been trained 1610, the input data that was received 1602 may be fed to the root node of the HCMS, and predictions generated 1612, by both the hierarchical model and the benchmark model, as to which components, identified in the input data, should be repaired/replaced. That is, the benchmark model and the hierarchical model may both be used to generate respective predictions 1612 as to which components, identified in the input data, should be repaired/replaced. The hierarchical structure may then be applied 1613 to the predictions generated by the original model prior to a benchmarking operation 1614.

In the benchmarking operation, one or more of the predictions that were generated 1612 by the hierarchical model may be compared to predictions generated 1612 by the benchmark model. As noted, the benchmark model may be one which does not employ any kind of hierarchical structure or label aggregations. A user may then decide whether to use the predictions generated by the HCMS, or the predictions generated by the benchmark model.

F. Further Example Embodiments

Following are some further example embodiments of the invention. These are presented only by way of example and are not intended to limit the scope of the invention in any way.

Embodiment 1. A method, comprising: accessing input data comprising data elements from logs that identify user problems experienced with computing system components, the data elements each being associated with a respective original class label that identifies a class of computing system components to which the data element relates, the respective original class labels forming a group of class labels, and a first one of the original class labels is overrepresented in the group; reducing the overrepresentation of the first original class label in the group by creating an arbitrary aggregation of some of the class labels that includes the first original class label; building a hierarchical classification modelling structure configured to classify the input data using the aggregation, and also using one of the original class labels; creating, based on a configuration of the hierarchical modeling structure, prepared data in which one or more of the original class labels is replaced by the aggregation; training, using the prepared data, a hierarchical model that is included in the hierarchical classification modeling structure; training a benchmark model using the original class labels; collecting classification performance metrics of the benchmark model and of the hierarchical model; generating a prediction, using the hierarchical model, to obtain a first predicted label; generating a prediction, using the benchmark model, to obtain a second predicted label; and comparing, based on the first predicted label and the second predicted label, the classification performance metrics of the benchmark model with the classification performance metrics of the hierarchical model.

Embodiment 2. The method as recited in embodiment 1, wherein the hierarchical classification modeling structure includes a root node configured to receive the input data, and the hierarchical classification modeling structure further includes one or more parent nodes, and one or more child nodes, and each of the parent nodes and child nodes runs a respective instance of the hierarchical model.

Embodiment 3. The method as recited in embodiment 2, wherein each node includes a Model field that contains a list of key: value pairs, where each key is a class label resulting from the aggregating, and each value is a list of original class labels included in an aggregation.

Embodiment 4. The method as recited in embodiment 2, wherein a Parent field in a Model field of one of the child nodes indicates, to which label of a parent node, one or more original class labels of the child node correspond.

Embodiment 5. The method as recited in any of embodiments 1-4, wherein the prepared data is created by traversing the entire hierarchical classification modeling structure and assigning a respective original class label to all of the input data.

Embodiment 6. The method as recited in embodiment 5, wherein the traversing begins at a root node of the hierarchical classification modeling structure.

Embodiment 7. The method as recited in any of embodiments 1-6, wherein the computing system component identified as a candidate for repair or replacement has an original class label that is included in the aggregation.

Embodiment 8. The method as recited in any of embodiments 1-7, further comprising displaying one of the predicted labels to a user, along with a confidence score C of the prediction, and historical performance metrics M, comparing the hierarchical model and the benchmark model.

Embodiment 9. The method as recited in any of embodiments 1-8, wherein the aggregation is associated with a root node of the hierarchical classification modeling structure, and another aggregation is associated with another node of the hierarchical classification modeling structure.

Embodiment 10. The method as recited in any of embodiments 1-9, wherein the training of the hierarchical model comprises providing a respective trained hierarchical model instance associated with each node of the hierarchical classification modeling structure.

Embodiment 11. A system for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 17:
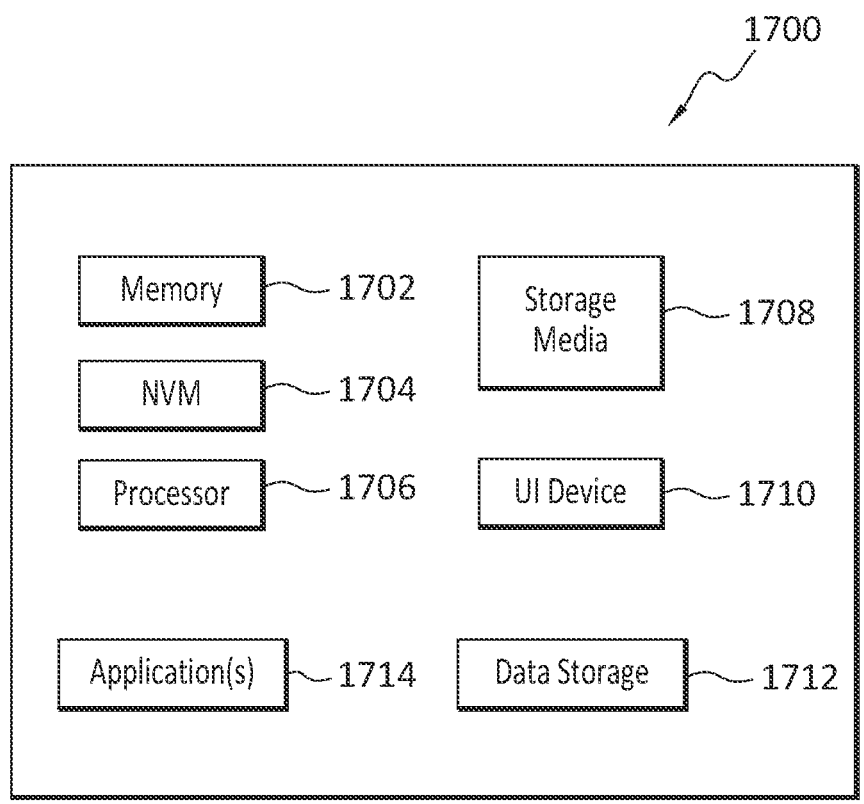
FIG. 17 discloses an example computing entity operable to perform any of the claimed methods, processes, and operations.

With reference briefly now to FIG. 17, any one or more of the entities disclosed, or implied, by FIGS. 1-16 and/or elsewhere herein, may take the form of, or include, or be implemented on, or hosted by, a physical computing device, one example of which is denoted at 1700. As well, where any of the aforementioned elements comprise or consist of a virtual machine (VM), that VM may constitute a virtualization of any combination of the physical components disclosed in FIG. 17.

In the example of FIG. 17, the physical computing device 1700 includes a memory 1702 which may include one, some, or all, of random access memory (RAM), non-volatile memory (NVM) 1704 such as NVRAM for example, read-only memory (ROM), and persistent memory, one or more hardware processors 1706, non-transitory storage media 1708, UI (user interface) device 1710, and data storage 1712. One or more of the memory components 1702 of the physical computing device 1700 may take the form of solid state device (SSD) storage. As well, one or more applications 1714 may be provided that comprise instructions executable by one or more hardware processors 1706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   accessing input data comprising data elements from logs that identify user problems experienced with computing system components, the data elements each being associated with a respective original class label that identifies a class of computing system components to which the data element relates, the respective original class labels forming a group of class labels, and a first one of the original class labels is overrepresented in the group;
   reducing the overrepresentation of the first original class label in the group by creating an arbitrary aggregation of some of the class labels that includes the first original class label;
   building a hierarchical classification modelling structure configured to classify the input data using the aggregation, and also using one of the original class labels;
   creating, based on a configuration of the hierarchical modeling structure, prepared data in which one or more of the original class labels is replaced by the aggregation;
   training, using the prepared data, a hierarchical model that is included in the hierarchical classification modeling structure;
   training a benchmark model using the original class labels;
   collecting classification performance metrics of the benchmark model and of the hierarchical model;
   generating a prediction, using the hierarchical model, to obtain a first predicted label;
   generating a prediction, using the benchmark model, to obtain a second predicted label; and
   comparing, based on the first predicted label and the second predicted label, the classification performance metrics of the benchmark model with the classification performance metrics of the hierarchical model.

2. The method as recited in claim 1, wherein the hierarchical classification modeling structure includes a root node configured to receive the input data, and the hierarchical classification modeling structure further includes one or more parent nodes, and one or more child nodes, and each of the parent nodes and child nodes runs a respective instance of the hierarchical model.

3. The method as recited in claim 2, wherein each node includes a Model field that contains a list of key: value pairs, where each key is a class label resulting from the aggregating, and each value is a list of original class labels included in an aggregation.

4. The method as recited in claim 2, wherein a Parent field in a Model field of one of the child nodes indicates, to which label of a parent node, one or more original class labels of the child node correspond.

5. The method as recited in claim 1, wherein the prepared data is created by traversing the entire hierarchical classification modeling structure and assigning a respective original class label to all of the input data, wherein the traversing begins at a root node of the hierarchical classification modeling structure.

6. The method as recited in claim 1, further comprising performing, based on the comparing, an inferencing operation comprising determining whether to:
   proceed recursively across hierarchical predictions at each level of the hierarchical model in the hierarchical classification modeling structure;
   stop and use the first predicted label from the hierarchical model; or
   abandon the hierarchical predictions in favor of the benchmark model.

7. The method as recited in claim 1, wherein the computing system component identified as a candidate for repair or replacement has an original class label that is included in the aggregation.

8. The method as recited in claim 1, further comprising displaying one of the predicted labels to a user, along with a confidence score C of the prediction, and historical performance metrics M, comparing the hierarchical model and the benchmark model.

9. The method as recited in claim 1, wherein the aggregation is associated with a root node of the hierarchical classification modeling structure, and another aggregation is associated with another node of the hierarchical classification modeling structure.

10. The method as recited in claim 1, wherein the training of the hierarchical model comprises providing a respective trained hierarchical model instance associated with each node of the hierarchical classification modeling structure.

11. A non-transitory storage medium having stored therein instructions that are executable by one or more hardware processors to perform operations comprising:
   accessing input data comprising data elements from logs that identify user problems experienced with computing system components, the data elements each being associated with a respective original class label that identifies a class of computing system components to which the data element relates, the respective original class labels forming a group of class labels, and a first one of the original class labels is overrepresented in the group;

reducing the overrepresentation of the first original class label in the group by creating an arbitrary aggregation of some of the class labels that includes the first original class label;

building a hierarchical classification modelling structure configured to classify the input data using the aggregation, and also using one of the original class labels;

creating, based on a configuration of the hierarchical modeling structure, prepared data in which one or more of the original class labels is replaced by the aggregation;

training, using the prepared data, a hierarchical model that is included in the hierarchical classification modeling structure;

training a benchmark model using the original class labels;

collecting classification performance metrics of the benchmark model and of the hierarchical model;

generating a prediction, using the hierarchical model, to obtain a first predicted label;

generating a prediction, using the benchmark model, to obtain a second predicted label; and comparing, based on the first predicted label and the second predicted label, the classification performance metrics of the benchmark model with the classification performance metrics of the hierarchical model.

12. The non-transitory storage medium as recited in claim 11, wherein the hierarchical classification modeling structure includes a root node configured to receive the input data, and the hierarchical classification modeling structure further includes one or more parent nodes, and one or more child nodes, and each of the parent nodes and child nodes runs a respective instance of the hierarchical model.

13. The non-transitory storage medium as recited in claim 12, wherein each node includes a Model field that contains a list of key: value pairs, where each key is a class label resulting from the aggregating, and each value is a list of original class labels included in an aggregation.

14. The non-transitory storage medium as recited in claim 12, wherein a Parent field in a Model field of one of the child nodes indicates, to which label of a parent node, one or more original class labels of the child node correspond.

15. The non-transitory storage medium as recited in claim 11, wherein the prepared data is created by traversing the entire hierarchical classification modeling structure and assigning a respective original class label to all of the input data, wherein the traversing begins at a root node of the hierarchical classification modeling structure.

16. The non-transitory storage medium as recited in claim 15, wherein the operations further comprise performing, based on the comparing, an inferencing operation comprising determining whether to:

proceed recursively across hierarchical predictions at each level of the hierarchical model in the hierarchical classification modeling structure;

stop and use the first predicted label from the hierarchical model; or abandon the hierarchical predictions in favor of the benchmark model.

17. The non-transitory storage medium as recited in claim 11, wherein the computing system component identified as a candidate for repair or replacement has an original class label that is included in the aggregation.

18. The non-transitory storage medium as recited in claim 11, wherein the operations further comprise displaying one of the predicted labels to a user, along with a confidence score C of the prediction, and historical performance metrics M, comparing the hierarchical model and the benchmark model.

19. The non-transitory storage medium as recited in claim 11, wherein the aggregation is associated with a root node of the hierarchical classification modeling structure, and another aggregation is associated with another node of the hierarchical classification modeling structure.

20. The non-transitory storage medium as recited in claim 11, wherein the training of the hierarchical model comprises providing a respective trained hierarchical model instance associated with each node of the hierarchical classification modeling structure.

* * * * *

UNITED STATES PATENT AND TRADEMARK OFFICE
CERTIFICATE OF CORRECTION

PATENT NO. : 12,411,751 B2  
APPLICATION NO. : 17/695526  
DATED : September 9, 2025  
INVENTOR(S) : Rômulo Teixeira de Abreu Pinho et al.

Page 1 of 1

It is certified that error appears in the above-identified patent and that said Letters Patent is hereby corrected as shown below:

In the Specification

Column 6
Line 59, change "may only used for" to -- may only be used for --

Column 15
Line 11, change "an benchmark modeling approach" to -- a benchmark modeling approach --

Column 15
Line 31, change "using a combinations of domain expertise" to -- using a combination of domain expertise --

Signed and Sealed this
Twenty-third Day of December, 2025

John A. Squires
*Director of the United States Patent and Trademark Office*